United States Patent
Wang et al.

(10) Patent No.: US 12,484,923 B1
(45) Date of Patent: Dec. 2, 2025

(54) HAND-HELD PISTOL-SHAPED MULTI-ANGLE BENDING SURGICAL INSTRUMENT

(71) Applicant: Jilin Jinbohong Intelligent Technology Co., Ltd., Changchun (CN)

(72) Inventors: Baosheng Wang, Changchun (CN); Yue Zhang, Changchun (CN); Chunju Li, Changchun (CN); Liang Zhou, Changchun (CN)

(73) Assignee: Jilin Jinbohong Intelligent Technology Co., Ltd., Changchun (CN)

( * ) Notice: Subject to any disclaimer, the term of this patent is extended or adjusted under 35 U.S.C. 154(b) by 0 days.

(21) Appl. No.: 19/200,757

(22) Filed: May 7, 2025

(51) Int. Cl.
    *A61B 17/29* (2006.01)
    *A61B 17/00* (2006.01)

(52) U.S. Cl.
    CPC ..... *A61B 17/2909* (2013.01); *A61B 2017/00477* (2013.01); *A61B 2017/00862* (2013.01);
(Continued)

(58) Field of Classification Search
    CPC ........ A61B 17/2909; A61B 2017/2912; A61B 2017/2913; A61B 2017/2915; A61B 2017/2916; A61B 2017/2917; A61B 2017/292; A61B 2017/00477; A61B 2017/00862; A61B 2017/2903;
(Continued)

(56) References Cited

U.S. PATENT DOCUMENTS

| | | | | |
|---|---|---|---|---|
| 2008/0314957 | A1* | 12/2008 | Boudreaux | A61B 17/295 |
| | | | | 128/898 |
| 2014/0263569 | A1* | 9/2014 | Williams | A61B 17/105 |
| | | | | 227/180.1 |

(Continued)

FOREIGN PATENT DOCUMENTS

| CN | 202437265 U | 9/2012 |
|---|---|---|
| CN | 116407215 A | 7/2023 |

(Continued)

*Primary Examiner* — Katherine H Schwiker
*Assistant Examiner* — Rachael L Geiger
(74) *Attorney, Agent, or Firm* — Bayramoglu Law Offices LLC

(57) ABSTRACT

A hand-held pistol-shaped multi-angle bending surgical instrument includes a clamp head mechanism, a clamp head rotation control mechanism, a clamp head bending control mechanism, a clamp head opening and closing control mechanism, a self-locking mechanism and a pistol-shaped handle; the clamp head mechanism is connected to the clamp head rotation control mechanism, the clamp head bending control mechanism and the clamp head opening and closing control mechanism respectively, the clamp head rotation control mechanism is connected to the clamp head bending control mechanism, the clamp head bending control mechanism is connected to the clamp head opening and closing control mechanism, the clamp head opening and closing control mechanism is connected to the self-locking mechanism; the clamp head bending control mechanism, the clamp head opening and closing control mechanism and the self-locking mechanism are all connected to the pistol- (Continued)

shaped handle. The working end of the surgical instrument is multi-angle bendable.

8 Claims, 12 Drawing Sheets

(52) U.S. Cl.
CPC ............... *A61B 2017/2903* (2013.01); *A61B 2017/2919* (2013.01); *A61B 2017/2925* (2013.01); *A61B 2017/2929* (2013.01); *A61B 2017/2939* (2013.01); *A61B 2017/2943* (2013.01); *A61B 2017/2946* (2013.01)

(58) Field of Classification Search
CPC .... A61B 2017/2919; A61B 2017/2925; A61B 2017/2929; A61B 2017/2939; A61B 2017/2943; A61B 2017/2946
See application file for complete search history.

(56) References Cited

U.S. PATENT DOCUMENTS

| | | | | |
|---|---|---|---|---|
| 2019/0133596 | A1* | 5/2019 | Brodaczewski | A61B 17/10 |
| 2022/0370069 | A1* | 11/2022 | Simms | A61B 17/072 |
| 2024/0268826 | A1* | 8/2024 | Huang | A61B 17/07207 |

FOREIGN PATENT DOCUMENTS

| | | |
|---|---|---|
| CN | 219289608 U | 7/2023 |
| CN | 118121268 A | 6/2024 |

\* cited by examiner

HAND-HELD PISTOL-SHAPED MULTI-ANGLE BENDING SURGICAL INSTRUMENT

CROSS REFERENCE TO THE RELATED APPLICATIONS

This application is based upon and claims priority to Chinese Patent Application No. 202410744337.7, filed on Jun. 11, 2024, the entire contents of which are incorporated herein by reference.

TECHNICAL FIELD

The invention belongs to the technical field of surgical instruments, specifically, a hand-held pistol-shaped multi-angle bending surgical instrument.

BACKGROUND

Minimally invasive surgery represented by laparoscopic surgery has experienced years of development and has formed a relatively independent discipline, deriving a series of minimally invasive surgeries such as thoracoscopy, pelvic endoscopy, and arthroscopy. At present, minimally invasive surgery has become the most cutting-edge and complex technology in the field of surgery, and many advanced equipment, materials, and instruments have been pioneered in this field. Minimally invasive surgery refers to the operation of resection or repair of organ lesions in the abdominal cavity, thoracic cavity, pelvic cavity, or articular cavity through the formation of several surgical channels on the surface of the human body, or the natural cavity of the human body, such as oral cavity, urethra, rectum, vagina, etc., the endoscope and surgical instruments enter the body cavity through the above channels, under the supervision of the endoscope, the doctor operates the surgical instruments in vitro, extends the working end of the surgical instruments into the patient's body cavity, and removes the lesions in the cavity or repairs and sutures the organs, and removes the endoscope and surgical instruments after the operation, the whole minimally invasive surgery can be completed by suturing the small hole on the body surface or the natural cavity incision. Compared with traditional open surgery, minimally invasive surgery has the advantages of less trauma, faster postoperative recovery, lower recurrence rate, and fewer complications.

The position of the abdominal wall trocar in thoracoscopic and laparoscopic surgery is relatively fixed, the surgical instruments are designed as rigid straight tubes, which reversely map the doctor's hand movements. During the operation, the working end of the surgical instrument is often difficult to reach the deep part of the abdominal cavity and the narrow or occluded area, resulting in the problem of seeing but can't touching; even if it arrives reluctantly, it will be difficult to complete highly flexible operations such as separation and suture due to the limited range of activities. Even if the surgical instruments with angle grasping forceps, pre-bending, or rotatable wrists at the working end can assist in completing some angle operations, there are still problems such as insufficient flexibility and mutual interference of instruments, resulting in low surgical efficiency, difficult operation, and even surgical complications. Therefore, the continuous development of minimally invasive surgical techniques requires surgical instruments to have more freedom and greater flexibility.

In the existing technology, the Chinese patent with the public number CN116407215 A discloses a wearable multi-degree-of-freedom flexible surgical instrument, which includes an executive end, a wearable handle, an extension section, and a control end. The surgical instrument is designed as a wearable structure, so the whole hand can pass through the annular structure and enter the hand operation area when the operator (doctor) uses it. In the process of minimally invasive surgery, a Chuka will be set up in the patient's surgical area to support the surgical instrument, and then through the support of the operator's hand ring department to the annular structure of the surgical instrument, the surgical instrument can be kept stable without holding with the hand, and the whole hand can be completely liberated for other operations. However, there are still some problems with the surgical instrument: the operator needs to extend the whole hand into the surgical instrument for operation, which is very inconvenient to use, and there is no self-locking function in the mechanical structure displayed by the surgical instrument, and the overall mechanical structure has certain safety hazards. For example, 1, poor operational stability; surgical instruments without self-locking structure are more susceptible to external factors in operation, resulting in instrument movement or slippage, thus affecting the accuracy and smooth operation of the operation. 2, the probability of accidental injury is high; due to poor operational stability and the risk of instrument shedding, the absence of a self-locking structure of surgical instruments will significantly increase the probability of accidental injury to patients. Doctors may accidentally injure patients due to the instability of surgical instruments during the operation, especially during fine surgery, this risk is more prominent. 3, the effect of surgery will be affected; the lack of the self-locking structure of surgical instruments may lead to a decrease in the accuracy and stability of surgical operations, thus affecting the surgical results. This effect may be more pronounced in surgeries that require careful manipulation. The decline in surgical outcomes may lead to the need for additional treatment or surgery, increasing the patient's pain and economic burden.

In the existing technology, the Chinese patent with the public number of CN219289608U discloses a bending surgical instrument, which includes a short thread bending component with two short thread bending structures at the head end and the tail end, so as to adjust the bending posture of the short thread bending component by the linkage bending of the two short thread bending structures in different directions. And has two long thread bending structures located at the head end and the tail end, so as to adjust the bending posture of the long thread bending component by the linkage bending of the two long thread bending structures in different directions; and a functional device for connecting a long thread bending component; among them, a part of the short thread bending component and the long thread bending component are overlapped, and the operation position of the functional device can be adjusted by adjusting the bending posture of the short thread bending component and the long thread bending component. The disadvantage of the surgical instrument is that the structure of controlling the opening, closing, and bending of the clamp head is too complicated, and the structure of controlling the opening, closing, and bending of the clamp head is controlled by multiple transmission soft shafts. This design not only increases the risk point of the structure but also increases the overall assembly difficulty of the surgical instrument. Specifically, 1, manufacturing process defects; the manufacturing process of the soft shaft has an important influence on its performance. If there are defects in the manufacturing process, such as high surface roughness and insufficient dimensional accuracy, it may lead to problems such as increased friction and increased vibration during the use of the transmission soft shaft, which in turn affects the transmission effect and system stability. 2, insufficient installation accuracy; the installation accuracy of the transmission soft shaft is very important for its normal operation. If there are deviations or errors in the installation process, it may lead to problems such as uneven force and unstable operation of the transmission soft shaft, and may even cause mechanical failure. Therefore, when installing the transmission soft shaft, it should be carried out in strict accordance with the operating procedures to ensure that the installation accuracy meets the requirements. 3, wear and fracture risk; with the increase of use time, the transmission soft shaft will inevitably appear to wear phenomenon. If it is worn to a certain extent and not replaced in time, it may lead to serious consequences such as fracture of the transmission soft shaft. In addition, the transmission soft shaft may also break when subjected to excessive load or impact. 4, overload and impact effects; the transmission soft shaft may be affected by overload or impact during operation. Overload may cause the transmission soft shaft to break due to excessive force, while the impact may cause instantaneous high stress on the transmission soft shaft, which may lead to fatigue fracture.

SUMMARY

Given the problems existing in the existing surgical instruments, the invention provides a hand-held pistol-shaped multi-angle bending surgical instrument.

The technical scheme adopted by the invention to solve the technical problems is as follows:

The invention provides a hand-held pistol-shaped multi-angle bending surgical instrument, including a clamp head mechanism, a clamp head rotation control mechanism, a clamp head bending control mechanism, a clamp head opening and closing control mechanism, a self-locking mechanism and a pistol-shaped handle; the clamp head mechanism is connected to the clamp head rotation control mechanism, the clamp head bending control mechanism and the clamp head opening and closing control mechanism respectively; the clamp head rotation control mechanism is connected to the clamp head bending control mechanism; the clamp head bending control mechanism is connected to the clamp head opening and closing control mechanism; the clamp head opening and closing control mechanism is connected to the self-locking mechanism; the clamp head bending control mechanism, the clamp head opening and closing control mechanism and the self-locking mechanism are all connected to the pistol-shaped handle.

Furthermore, the clamp head mechanism includes:
a clamp teeth fixing seat;
upper clamp teeth and lower clamp teeth are respectively installed at a front end of the clamp teeth fixing seat;
a clamp head transmission soft shaft connecting pin inserted in the clamp teeth fixing seat;
a push rod inserted in a front end of the clamp head transmission soft shaft connecting pin, and two ends of the push rod are connected to the upper clamp teeth and the lower clamp teeth respectively;
an outer tube connected to the clamp head rotation control mechanism;
an inner tube placed in an outer tube and connected to the clamp head bending control mechanism;
a pull rod arranged in an inner tube and connected to the clamp head opening and closing control mechanism;
a rotating hinge support arranged in the outer tube, and the inner tube is connected to the rotating hinge support;
a clamp head connecting ring, both ends of the clamp head connecting ring are respectively connected to the clamp teeth fixing seat and the rotating hinge support;
a transmission soft shaft guide block placed at a rear end of the clamp teeth fixing seat, and two sides of the rear end of the transmission soft shaft guide block and two sides of the rear end of the clamp teeth fixing seat are respectively connected to the outer tube through a pin shaft;
a transmission soft shaft, the transmission soft shaft is inserted into the transmission soft shaft guide block, the clamp teeth fixing seat, and the clamp head transmission soft shaft connecting pin in turn, the two ends of the transmission soft shaft are connected to the clamp head transmission soft shaft connecting pin and the pull rod respectively.

Furthermore, clamp teeth on the upper clamp teeth surface are set one-to-one corresponding to the clamp teeth on the lower clamp teeth surface.

Furthermore, the clamp head rotation control mechanism includes:
an instrument flushing connector and a rotating base arranged in turn on the outer tube; a rear end of the rotating base is installed on the clamp head bending control mechanism and is fixed by a locking nut;
a locking spring set on the rotating base;
a rotating end cover and a fixing ring installed on the locking spring in turn; an outer ring of the fixing ring is connected to a side wall of the rotating end cover; a front end of the locking spring is resisted and fixed on an inner wall of the rotating end cover, and a rear end of the locking spring is resisted and fixed on the clamp head bending control mechanism, an inner ring of the rotating end cover is provided with a plurality of uniformly distributed limiting grooves;
a rotating nut assembled on the instrument flushing connector and the rotating end cover, and an inner ring of the rotating nut is connected to an outer ring of the rotating end cover;
a rotating locking pin installed on an outer wall of the rotating base; when the clamp head mechanism is in a rotating self-locking state, the rotating locking pin is inserted into a limiting groove of the inner ring of the rotating end cover; when the clamp head mechanism is in a free rotating state, the rotating locking pin is separated from the limiting groove of the inner ring of the rotating end cover.

Furthermore, an instrument flushing port is arranged on a front side wall of the instrument flushing connector; a rear end of the instrument flushing connector is provided with two symmetrical protrusions, and each protrusion is provided with a guide hole; a front end of the inner ring of the rotating nut is equipped with two symmetrical grooves, and the two grooves at the front end of the inner ring of the rotating nut are installed with the two protrusions at the rear end of the instrument flushing connector, two symmetrical guide holes are arranged on the side wall of the rotating end cover, two guide holes on the side wall of the rotating end cover are connected one-to-one with the guide holes on the two protrusions on the rear end of the instrument flushing connector through a rotating guide shaft.

Furthermore, the clamp head bending control mechanism includes:

a bottom plate;

an installation flange fixed at a front end of the bottom plate; the installation flange is connected to the clamp head rotation control mechanism;

a bearing seat fixed on the bottom plate;

a rotating shaft connected to the bearing seat through a bearing, an upper end of the rotating shaft extends out of the bottom plate;

a bending nut connected to a lower end of the rotating shaft by a rotating shaft nut;

bending lower teeth fixedly sleeved at an upper end of the rotating shaft;

a bending screw fixed on the installation flange; a rear end of the bending screw is installed on the clamp head opening and closing control mechanism through a bending screw rotating bearing;

bending upper teeth fixedly sleeved at the bending screw, and the bending lower teeth and the bending upper teeth are meshed with each other;

a bending slider arranged at the rear end of the bending screw;

a bending transmission pin fixed on an upper end of the bending slider, after the inner tube is extended from the clamp head rotation control mechanism, it is first fixed on the upper end of the bending slider through an inner tube fixing nut, and then passes through the bending transmission pin.

Furthermore, a bending slider installation hole is arranged in a middle of the bottom plate, and a protrusion is arranged at the lower end of the bending slider. The protrusion at the lower end of the bending slider is installed in the bending slider installation hole of the bottom plate.

Furthermore, the clamp head opening and closing control mechanism includes:

an opening and closing limit seat fixed at a rear end of the bottom plate of the clamp head bending control mechanism, the opening and closing limit seat is provided with rotating hole positions on both sides of the opening and closing limit seat, and the rotating bearing is installed on the opening and closing limit seat;

an opening and closing handle transmission rod installed at an upper end of the opening and closing limit seat through an opening and closing limit rod, a lower end of the opening and closing handle transmission rod passes through the bottom plate of the clamp head bending control mechanism, an upper end of the opening and closing handle transmission rod is respectively provided with push rod installation holes on both sides;

an opening and closing handle connected to a lower end of an opening and closing handle transmission rod;

an opening and closing handle limit pin sleeved on the opening and closing handle transmission rod;

a push rod, two ends of the push rod are respectively installed in push rod installation holes on both sides of the upper end of the opening and closing handle transmission rod, two ends of the push rod are respectively extended into the rotating hole position on the opening and closing limit seat, and two ends of the push rod can move horizontally in the rotating hole position of the opening and closing limit seat.

a pull rod locking seat fixed to an end of the pull rod;

a sliding sleeve fixed on the opening and closing handle transmission rod;

an opening and closing spring set on the sliding sleeve, and two ends of the opening and closing spring are fixed on the sliding sleeve and the pull rod locking seat respectively;

an opening and closing transmission pin, two ends of the opening and closing transmission pin are respectively connected to the pull rod and the push rod, and a part of the inner tube extending out of the bending transmission pin is inserted into the opening and closing transmission pin; the pull rod is fixed in the pull rod locking seat after passing through the opening and closing transmission pin, the push rod and the sliding sleeve in turn.

Furthermore, the opening and closing handle limit pin is an arc structure with an installation hole in the middle; a lower end of the opening and closing handle transmission rod is provided with a limit protrusion, and a middle of the upper end of the opening and closing handle transmission rod is provided with a through hole; a lower end of the opening and closing handle transmission rod passes through a middle mounting hole of the opening and closing handle limit pin, and then fixes the opening and closing handle limit pin through a limit protrusion.

Furthermore, the self-locking mechanism includes:

a self-locking support fixed at the upper end of the opening and closing limit seat;

an unlocking shaft installed on the self-locking support;

two dials respectively installed at both ends of the unlocking shaft;

an opening and closing locking disc fixed on the opening and closing handle transmission rod, the opening and closing locking disc is an arc-shaped structure as a whole, and an arc-shaped surface is provided with a tooth-shaped structure;

a self-locking elastic sheet fixed at a lower end of the self-locking support, the elastic sheet in a center of the self-locking elastic sheet is connected to the tooth-shaped structure of the arc-shaped surface of the opening and closing locking disc in a manner of clamping teeth, and the elastic sheet in the center of the self-locking elastic sheet is connected to the unlocking shaft in a manner of pressing; when the self-locking mechanism does not work, the elastic sheet at the center of the self-locking elastic sheet does not contact with the tooth-shaped structure of the arc-shaped surface of the opening and closing locking disc to relieve a self-locking state, when the self-locking mechanism works, the elastic sheet at the center of the self-locking elastic sheet contacts with the tooth-shaped structure of the arc-shaped surface of the opening and closing locking disc to form a self-locking state.

The beneficial effects of the invention are as follows:

The invention provides a hand-held pistol-shaped multi-angle bending surgical instrument, its working end is multi-angle bendable, and has multiple functions of rotation, bending, opening, and closing. At the same time, the overall structure of the invention is designed with a self-locking structure, which can realize self-locking in the rotation, bending, opening, and closing process of the clamp head mechanism, and greatly reduce the safety hazards in the use process. Compared with the existing technology, the invention improves the technical effect of the surgical instrument from the following aspects:

(1) In this invention, the opening and closing state of the clamp head mechanism is mainly controlled by a separate transmission soft shaft combined with the clamp head opening and closing control mechanism, which solves the shortcomings of using multiple transmission soft shafts for transmission control in the existing technology, and efficiently reduces the overall risk point of the surgical instrument;

(2) In this invention, the clamp head rotation control mechanism not only adds an instrument flushing connector in the structural design, but also adds a rotating pressing self-locking structure composed of a rotating nut, a rotating end cover, a locking spring, a rotating base, a fixing ring, a locking nut, a rotating locking pin, and a rotating guide shaft. Through the control of the clamp head rotation control mechanism, the clamp head mechanism can be rotated 360 degrees, and the clamp head mechanism can be self-locked when rotated to any angle, and the instrument flushing connector can solve the problem that the existing flexible surgical instruments are very troublesome during disinfection and cleaning;

(3) In the invention, the clamp head bending control mechanism controls the bending state of the clamp head mechanism through the driving of the bending screw, this structural design has a stable motion effect, and can also realize the self-locking function through the self-locking mechanism, which improves the stability and safety of the surgical instrument.

(4) In the invention, the clamp head opening and closing control mechanism adds opening and closing springs and other components in the structural design, which can make the operator more convenient and simpler to use.

(5) In the invention, the self-locking mechanism realizes the self-locking function skillfully through the structural cooperation between the opening and closing locking disc, the self-locking elastic sheet, and the unlocking shaft, which greatly improves the safety index of the operator in use.

(6) In the invention, the hand-held part is designed into a pistol-shaped handle with a man-machine effect, which greatly improves the operator's feeling of use and improves the stability and operation convenience of the overall operation of the surgical instrument.

Figure 1:
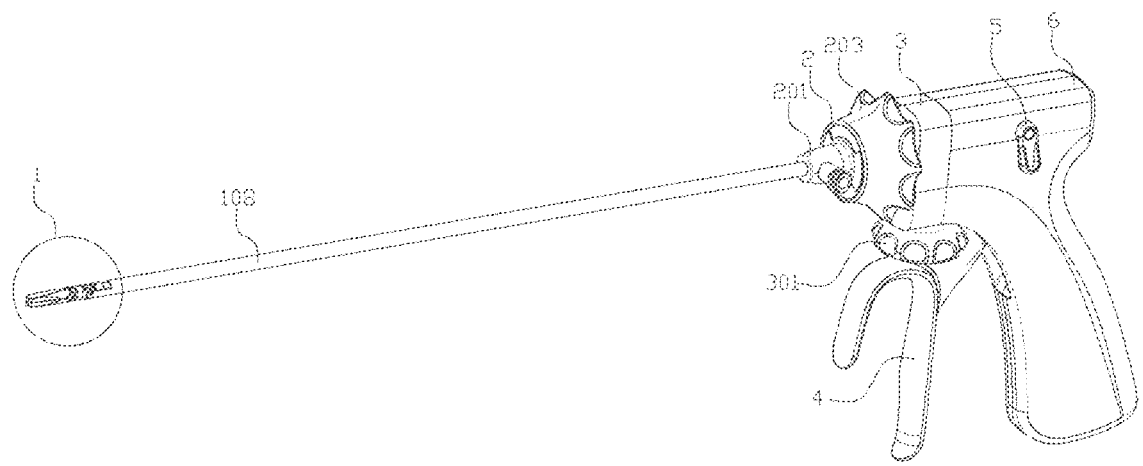
FIG. 1 is a structural diagram of the hand-held pistol-shaped multi-angle bending surgical instrument in the invention.

In the figures, 1, clamp head mechanism;

upper clamp teeth 101, the first upper clamp teeth connection hole 1011, the second upper clamp teeth connection hole 1012, lower clamp teeth 102, the first lower clamp teeth connection hole 1021, the second lower clamp teeth connection hole 1022, clamp head transmission soft shaft connecting pin 103, clamp teeth fixing seat 104, the first pin hole 1041, the second pin hole 1042, clamp head connecting ring 105, transmission soft shaft guide block 106, inner tube 107, outer tube 108, transmission soft shaft 109, rotating hinge support 110, push rod 111, pull rod 112;

2, clamp head rotation control mechanism;

instrument flushing connector 201, protrusion 2011, instrument flushing port 2012, fixing screw 202, rotating nut 203, groove 2031, rotating end cover 204, limiting groove 2041, guide hole 2042, locking spring 205, rotating base 206, fixing ring 207, locking nut 208, rotating locking pin 209, rotating guide shaft 210;

3, clamp head bending control mechanism;

bending nut 301, bending lower teeth 302, bending upper teeth 303, bending screw 304, bending slider 305, inner tube fixing nut 306, bending transmission pin 307, installation flange 308, bottom plate 309, bending slider installation hole 3091, bending screw rotating bearing 310, bearing seat 311, rotating shaft nut 312, bearing 313, rotating shaft 314;

4, clamp head opening and closing control mechanism;

opening and closing handle 401, opening and closing handle limit pin 402, opening and closing handle transmission rod 403, limit protrusion 4031, push rod installation hole 4032, the opening and closing spring 404, the pull rod locking seat 405, opening and closing transmission pin 406, opening and closing limit rod 407, opening and closing limit seat 408, the push rod 409, sliding sleeve 410;

5, self-locking mechanism;

dial 501, opening and closing locking disc 502, self-locking elastic sheet 503, unlocking shaft 504, block installation groove 5011, block 5041, self-locking support 505;

6, pistol-shaped handle.

DETAILED DESCRIPTION OF THE EMBODIMENTS

The following is a further detailed description of the invention in combination with the attached figures.

As shown in FIG. 1, the invention provides a hand-held pistol-shaped multi-angle bending surgical instrument mainly includes: a clamp head mechanism 1, a clamp head rotation control mechanism 2, a clamp head bending control mechanism 3, a clamp head opening and closing control mechanism 4, a self-locking mechanism 5 and a pistol-shaped handle 6. The clamp head mechanism 1 is connected to the clamp head rotation control mechanism 2, the clamp head bending control mechanism 3 and the clamp head opening and closing control mechanism 4 respectively; the clamp head rotation control mechanism 2 is connected to the clamp head bending control mechanism 3; the clamp head bending control mechanism 3 is connected to the clamp head opening and closing control mechanism 4; the clamp head opening and closing control mechanism 4 is connected to the self-locking mechanism 5; the clamp head bending control mechanism 3, the clamp head opening and closing control mechanism 4 and the self-locking mechanism 5 are all connected to the pistol-shaped handle 6.

Figure 2:
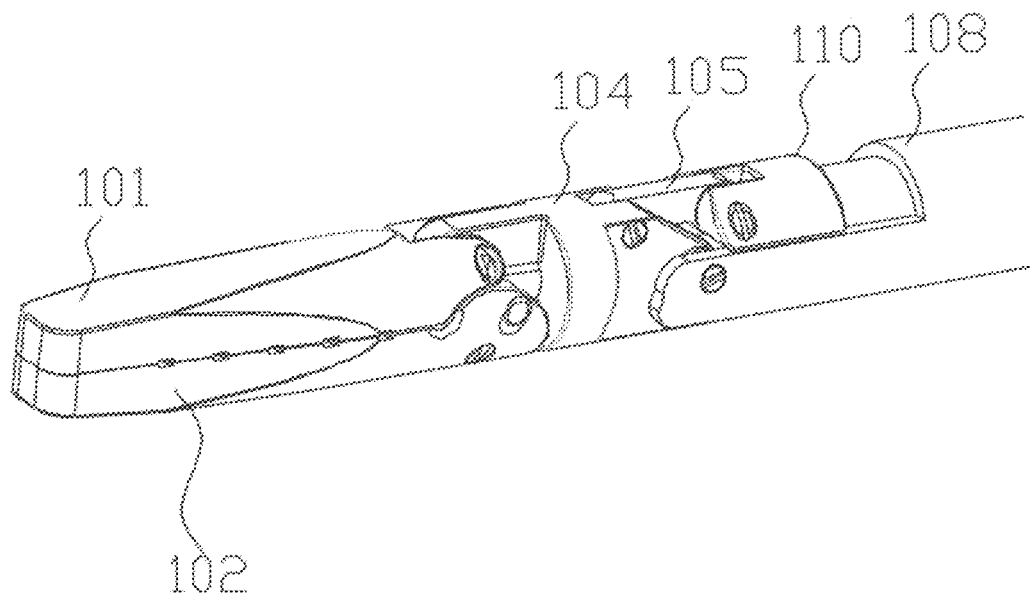
FIG. 2 is a structural diagram of the clamp head mechanism.
Figure 3:
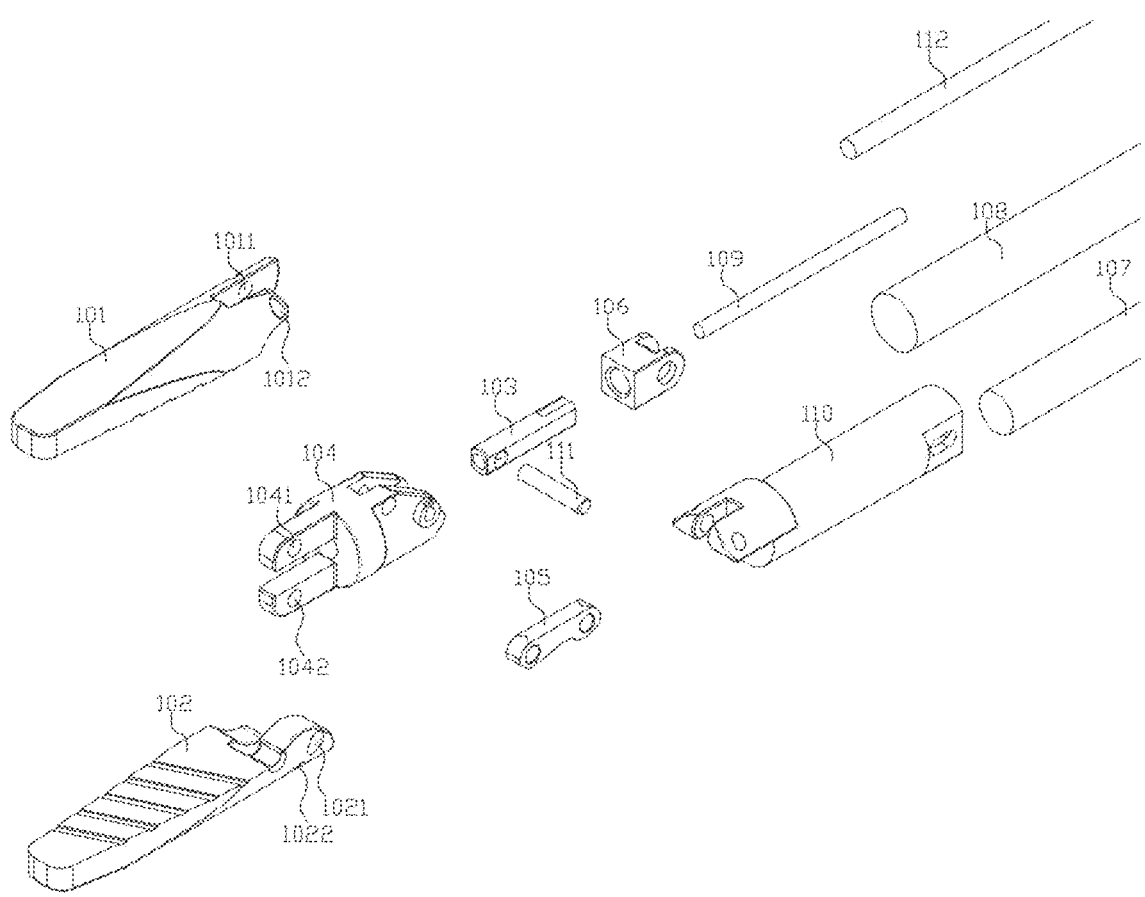
FIG. 3 is an explosion diagram of the clamp head mechanism.
Figure 4:
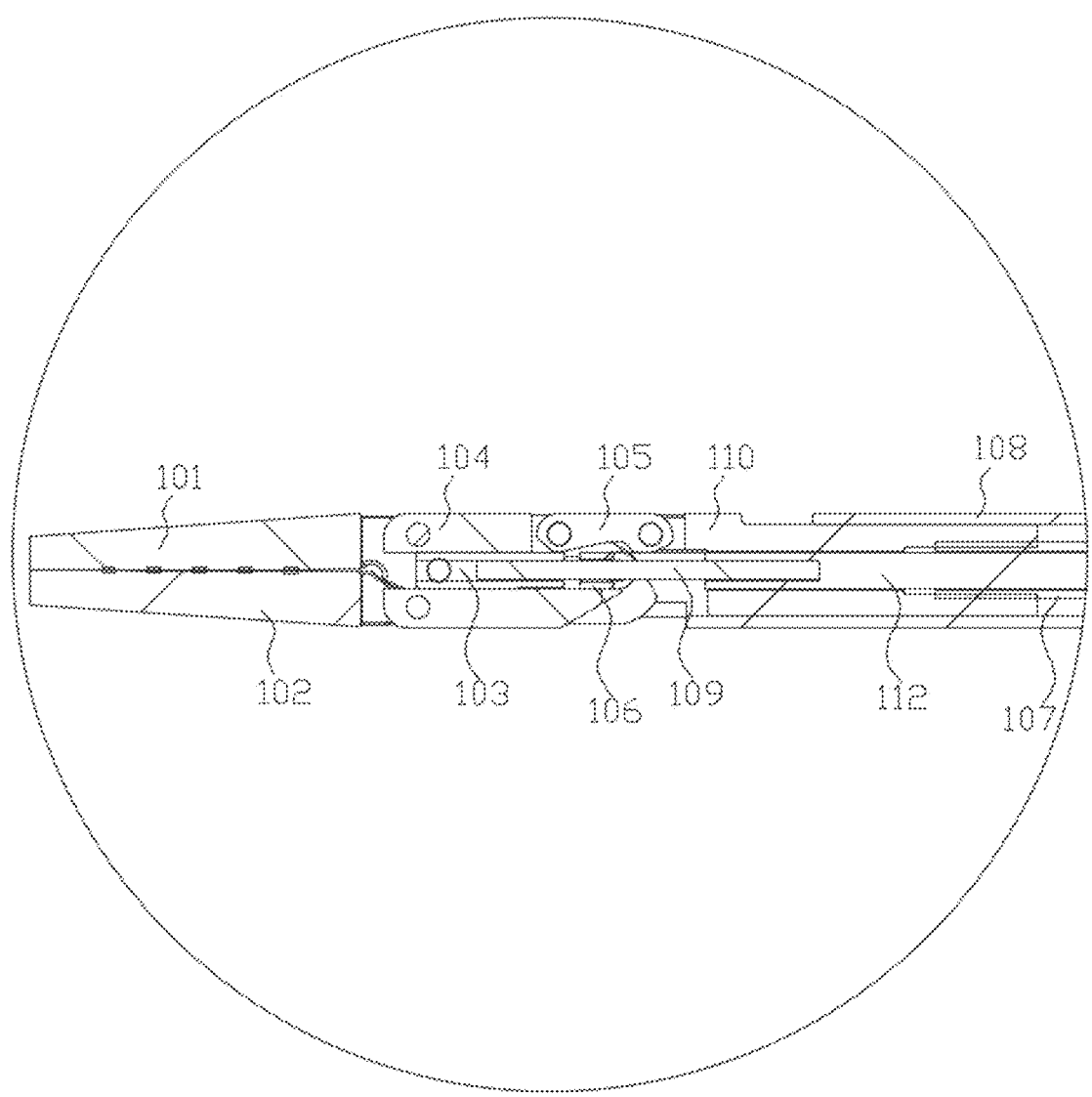
FIG. 4 is a profile of the clamp head mechanism.

As shown in FIGS. 2 to 4, the clamp head mechanism 1 mainly includes the upper clamp teeth 101, the lower clamp teeth 102, the clamp head transmission soft shaft connecting pin 103, the clamp teeth fixing seat 104, the clamp head connecting ring 105, the transmission soft shaft guide block 106, the inner tube 107, the outer tube 108, the transmission soft shaft 109, the rotating hinge support 110, the push rod 111 and the pull rod 112; among them, the pull rod 112 is placed in the inner tube 107, and the inner tube 107 is placed in the outer tube 108; the surface of the upper clamp teeth 101 is provided with clamp teeth, and the rear end of the upper clamp teeth 101 is provided with the first upper clamp teeth connection hole 1011 and the second upper clamp teeth connection hole 1012; the lower clamp teeth 102 is provided with clamp teeth on the surface, and the rear end of the lower clamp teeth 102 is provided with the first lower clamp teeth connection hole 1021 and the second lower clamp teeth connection hole 1022; the front end of the clamp teeth fixing seat 104 is provided with two supports, the upper support is provided with the first pin hole 1041, and the lower support is provided with the second pin hole 1042; the second upper clamp teeth connection hole 1012 at the rear end of the upper clamp teeth 101 is connected to the first pin hole 1041 on the front end of the clamp teeth fixing seat 104 through the pin shaft, and the second lower clamp teeth connection hole 1022 at the rear end of the lower clamp teeth 102 is connected to the second pin hole 1042 on the front end of the clamp teeth fixing seat 104 through the pin shaft, after the installation is completed, the clamp teeth on the surface of the upper clamp teeth 101 and the clamp teeth on the surface of the lower clamp teeth 102 should be set one by one, the clamp head transmission soft shaft connecting pin 103 is inserted into the central hole of the the clamp teeth fixing seat 104; the front end of the clamp head transmission soft shaft connecting pin 103 is provided with an installation hole, the push rod 111 is inserted into the installation hole at the front end of the clamp head transmission soft shaft connecting pin 103, and the push rod 111 should be perpendicular to the clamp head transmission soft shaft connecting pin 103, one end of the push rod 111 is inserted into the first upper clamp teeth connection hole 1011 at the rear end of the upper clamp teeth 101, and the other end of the push rod 111 is inserted into the first lower clamp teeth connection hole 1021 at the rear end of the lower clamp teeth 102, the upper side of the rear end of the clamp teeth fixing seat 104 is connected to the end of the clamp head connecting ring 105 through the pin shaft; the other end of the clamp head connecting ring 105 is connected to the front end of the rotating hinge support 110 through the pin shaft, the rear end of the rotating hinge support 110 is placed in the outer tube 108, the front end of the inner tube 107 is inserted into the rear end of the rotating hinge support 110, and the rear end of the rotating hinge support 110 is fixedly connected to the front end of the inner tube 107 through the pin shaft, the center of the transmission soft shaft guide block 106 has a through hole, and the pin holes are arranged on both sides of the rear end of the transmission soft shaft guide block 106, the middle part of the rear end of the fixed seat 104 is an open structure, and the pin holes are set on both sides of the open structure, the transmission soft shaft guide block 106 is placed in the open structure at the rear end of the clamp teeth fixing seat 104, and then the two sides of the rear end of the transmission soft shaft guide block 106 and the two sides of the open structure at the rear end of the clamp teeth fixing seat 104 are respectively connected to the front end of the outer tube 108 through the pin shaft, the front end of the transmission soft shaft 109 is inserted into the 106 center hole of the transmission soft shaft guide block, the 104 center hole of the clamp teeth fixing seat and the 103 center hole of the clamp head transmission soft shaft connecting pin. Among them, the front end of the transmission soft shaft 109 is connected to the clamp head transmission soft shaft connecting pin 103 through the pin shaft, and the rear end of the transmission soft shaft 109 is fixed with the front end of the pull rod 112 through the pin shaft, the basic working principle of the clamp head mechanism 1 is that, as shown in FIG. 4, when the operator pulls the pull rod 112 backward, the upper clamp teeth 101 and the lower clamp teeth 102 can be in a closed state, on the contrary, when the operator pushes the pull rod 112 forward, the transmission soft shaft 109 and the clamp teeth transmission soft shaft connecting pin 103 can be pushed forward, the force applied to the upper clamp teeth 101 and the lower clamp teeth 102 by the push rod 111 makes the upper clamp teeth 101 move upward and the lower clamp teeth 102 move downward, so that the upper clamp teeth 101 and the lower clamp teeth 102 are in a state of opening and closing. When the operator pulls the inner tube 107 backward, the rotating hinge support 110 can be pulled to move to the right, the forces among the rotating hinge support 110, the clamp head connecting ring 105, the clamp teeth fixing seat 104 and the outer tube 108 make the clamp teeth fixing seat 104, the upper clamp teeth 101 and the lower clamp teeth 102 bend upwards, on the contrary, when the operator pushes the inner tube 107 forward, the rotating hinge support 110 can be pushed forward, the forces among the rotating hinge support 110, the clamp head connecting ring 105, the clamp teeth fixing seat 104 and the outer tube 108 make the clamp teeth fixing seat 104, the upper clamp teeth 101 and the lower clamp teeth 102 bend downward.

Figure 5:
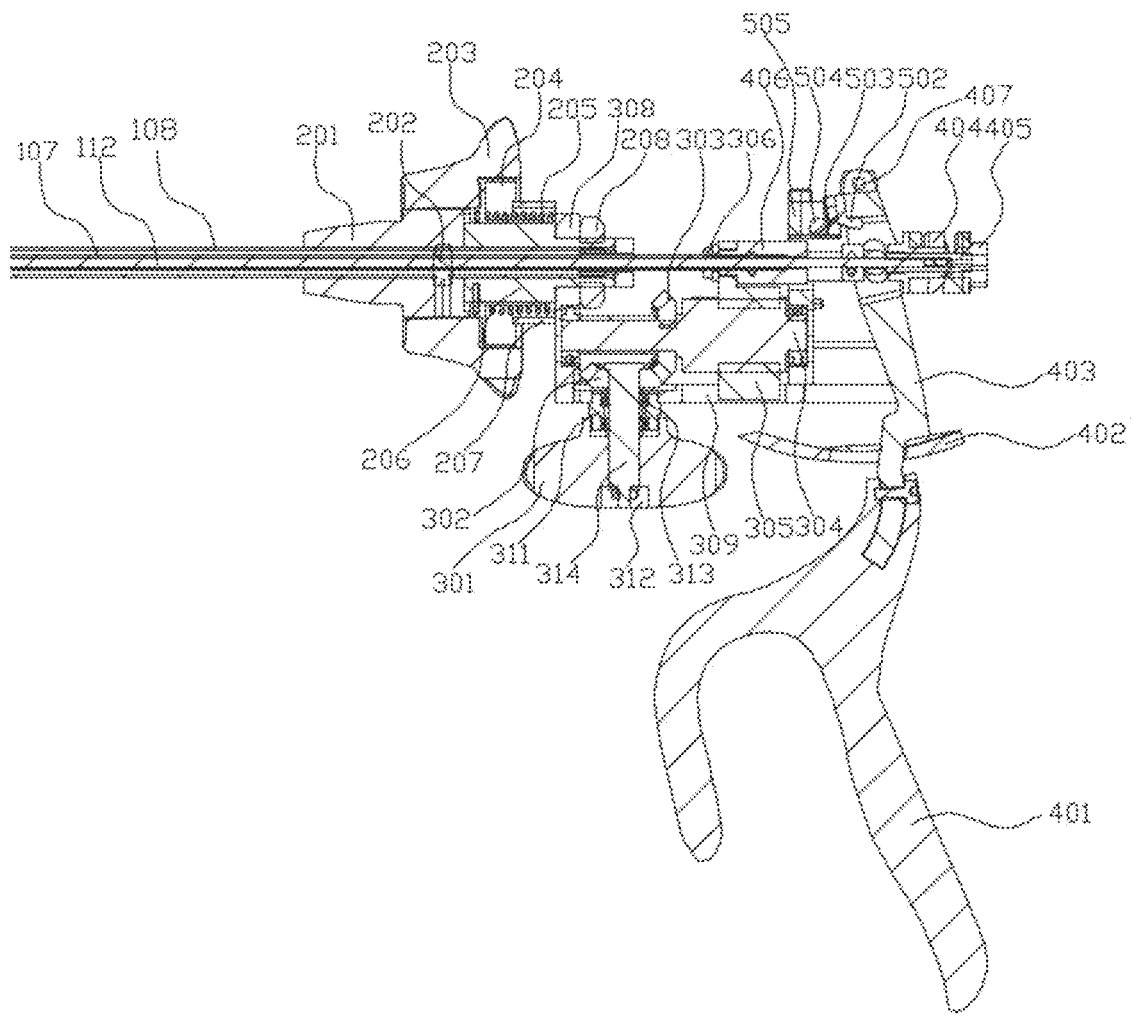
FIG. 5 is a partial profile of the hand-held pistol-shaped multi-angle bending surgical instrument in the invention.
Figure 6:
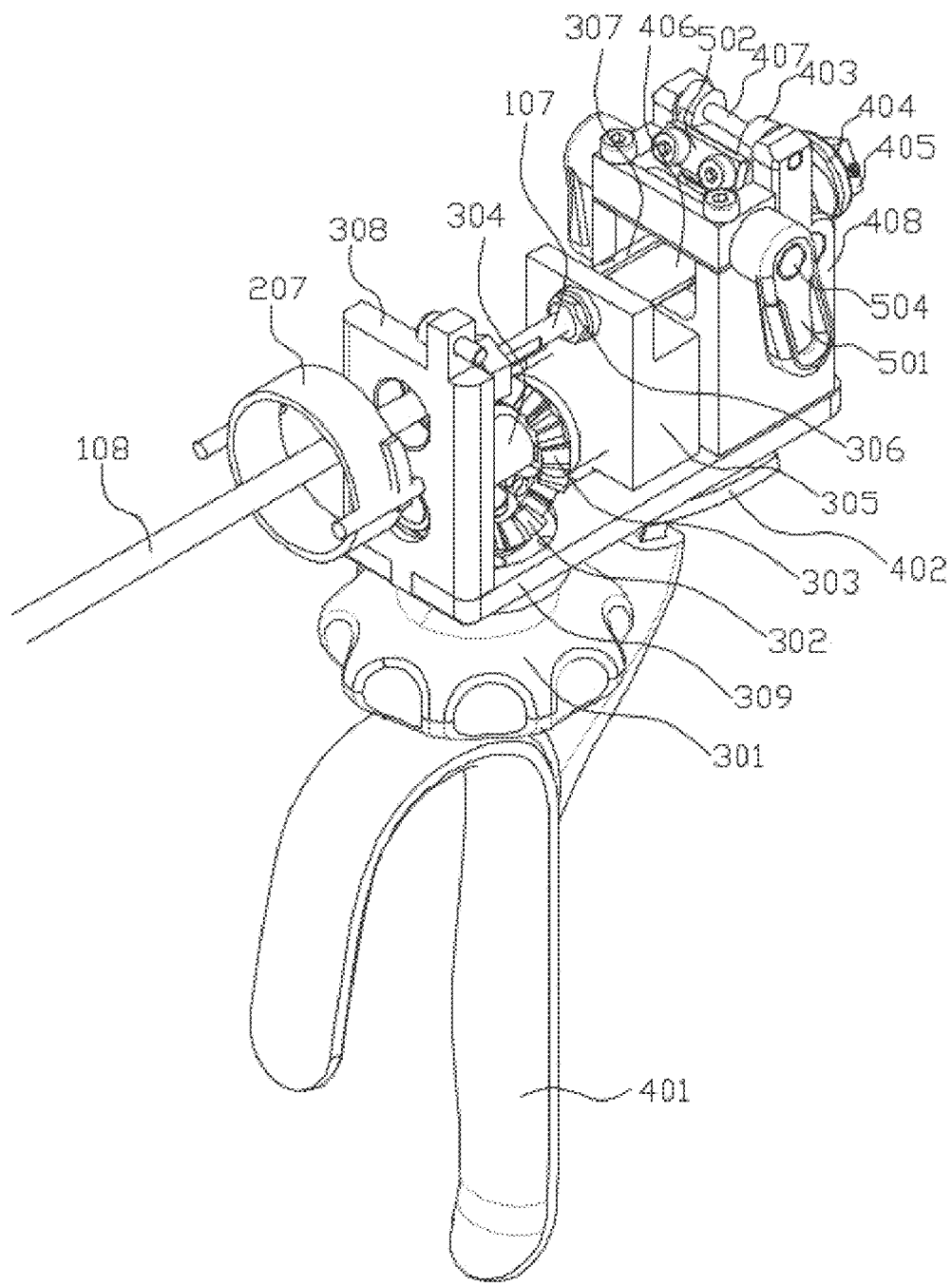
FIG. 6 is a schematic diagram of the connection relationship between the clamp head bending control mechanism, the clamp head opening and closing control mechanism, and the self-locking mechanism.
Figure 7:
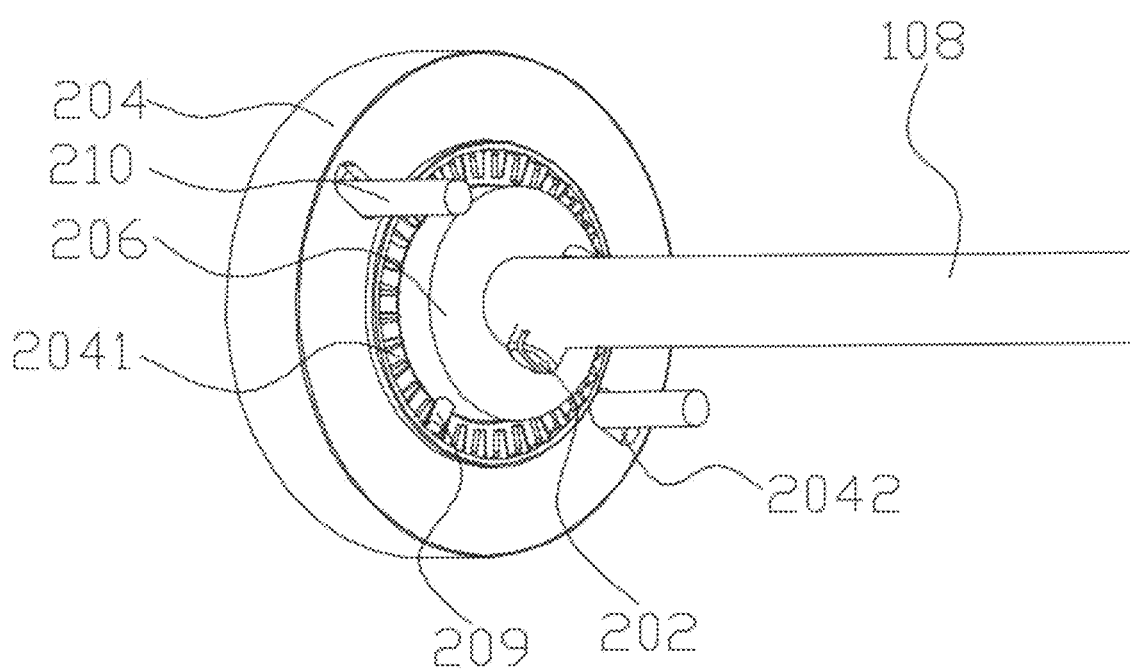
FIG. 7 is a schematic diagram of the connection relationship between the rotating end cover, the rotating base, and the rotating locking pin.
Figure 8:
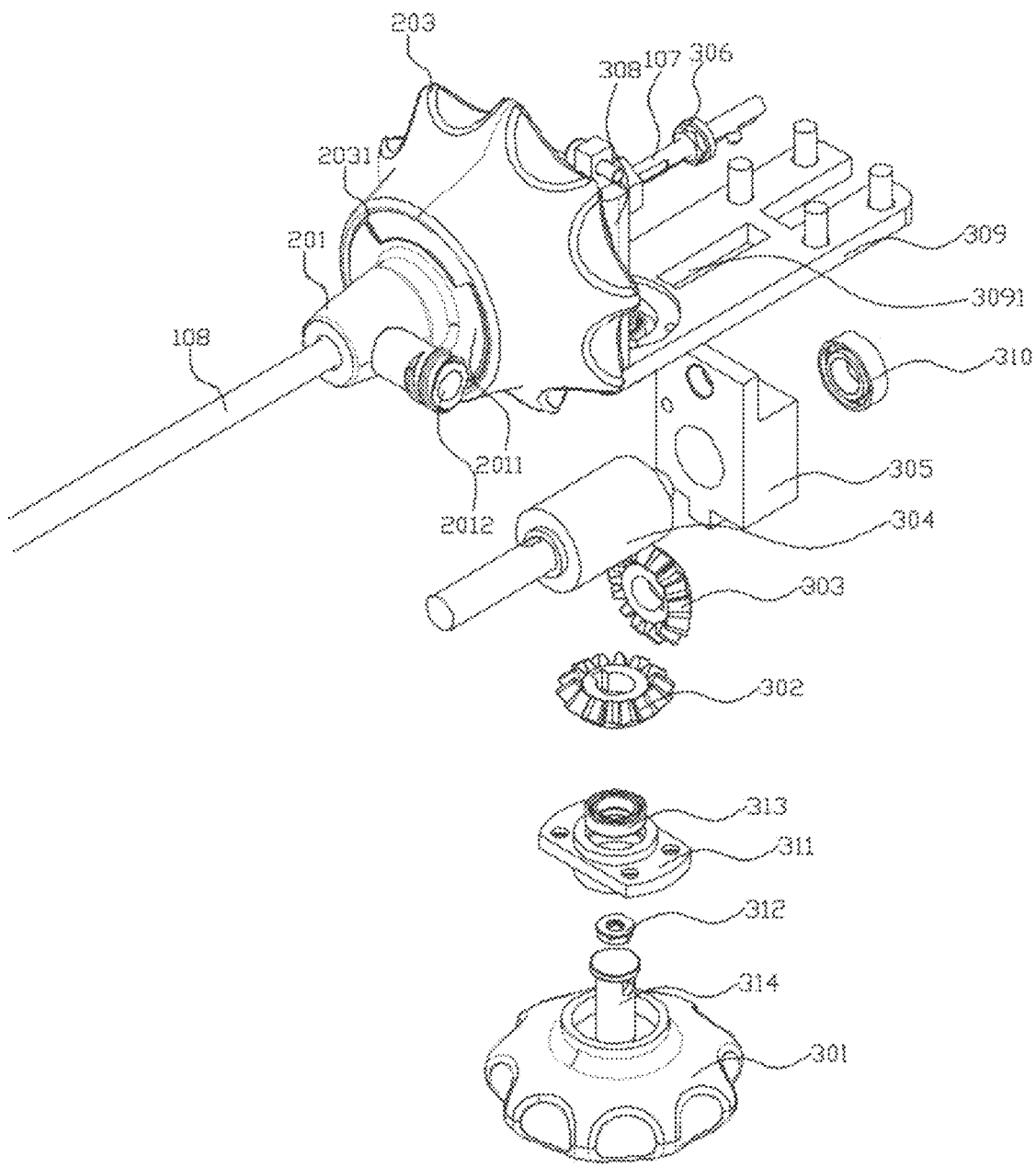
FIG. 8 is a structure diagram of the clamp head bending control mechanism.

As shown in FIG. 5 to FIG. 7, the clamp head rotation control mechanism 2 mainly includes the instrument flushing connector 201, the fixing screw 202, the rotating nut 203, the rotating end cover 204, the locking spring 205, the rotating base 206, the fixing ring 207, the locking nut 208, the rotating locking pin 209 and the rotating guide shaft 210; the instrument flushing port 2012 is set on the front side wall of the instrument flushing connector 201, and the rear end of the instrument flushing connector 201 is set with two symmetrical protrusions 2011, and each protrusion 2011 is set with a guide hole; the instrument flushing connector 201 is set on the outer tube 108, and the instrument flushing connector 201 is connected to the outer tube 108 through the fixing screw 202; the outer tube 108 is washed through the instrument flushing connector 201 and the rotating base 206 in turn to make the rear end of the outer tube 108 inside the rotating base 206, the rear end of the rotating base 206 is installed on the installation flange 308 in the clamp head bending control mechanism 3 and is fixed with the locking nut 208; the locking spring 205 is sleeved on the rotating base 206, the front end of the locking spring 205 is resisted and fixed on the inner wall of the rotating end cover 204, and the rear end of the locking spring 205 is resisted and fixed on the installation flange 308 in the clamp head bending control mechanism 3, the rotating end cover 204 and the fixing ring 207 are arranged on the locking spring 205 in turn, the outer ring 207 of the fixing ring is connected to the side wall of the rotating end cover 204 through the pin shaft, the inner ring of the rotating end cover 204 is provided with a plurality of uniformly distributed limiting grooves 2041; two symmetrical guide holes 2042 are also set on the side wall of the rotating end cover 204, a rotating locking pin 209 is installed on the outer wall of the rotating base 206; when the clamp head mechanism 1 is in the rotating self-locking state, the rotating locking pin 209 is inserted into the limiting groove 2041 of the inner ring of the rotating end cover 204, when the clamp head mechanism 1 is in the free rotating state, the rotating locking pin 209 is separated from the limiting groove 2041 of the inner ring of the rotating end cover 204; the rotating nut 203 is sleeved on the instrument flushing connector 201 and the rotating end cover 204; among them, the front end of the inner ring of the rotating nut 203 is equipped with two symmetrical grooves 2031, the two grooves 2031 at the front end of the inner ring of the rotating nut 203 and the two protrusions 2011 at the rear end of the instrument flushing connector 201 are fitted together, that is, the protrusion 2011 is inserted into the groove 2031, at the same time, the two guiding holes 2042 on the side wall of the rotating end cover 204 are connected one-to-one with the guiding holes on the protrusion 2011 through a rotating guide shaft 210; the rear end of the inner ring of the rotating nut 203 is connected to the outer ring of the rotating end cover 204 through the pin key. The basic working principle of the clamp head rotation control mechanism 2 is that the operator presses and rotates the rotating nut 203 backward so that the rotating nut 203 is separated from the instrument flushing connector 201, at the same time, the rotating nut 203 drives the rotating end cover 204 to move backward, so that the rotating locking pin 209 is separated from the limiting groove 2041 of the inner ring of the rotating end cover 204, at the same time, the rotating end cover 204 compresses the locking spring 205 to deform the locking spring 205, at this time, the outer tube 108 can be rotated freely to realize the 360-degree free rotation of the whole clamp head mechanism 1; on the contrary, the operator loosens the rotating nut 203, pushes the rotating nut 203 back to the rotating locking pin 209 by using the elastic restoring force of the locking spring 205, and reinserts the rotating locking pin 209 into the limiting groove 2041 of the inner ring of the rotating end cover 204, so that the whole clamp head mechanism 1 is in a rotating self-locking state, at this time, the whole clamp head mechanism 1 cannot rotate.

In this embodiment, the instrument flushing connector 201 can specifically use the Luer connector, but it is not limited to it.

Figure 9:
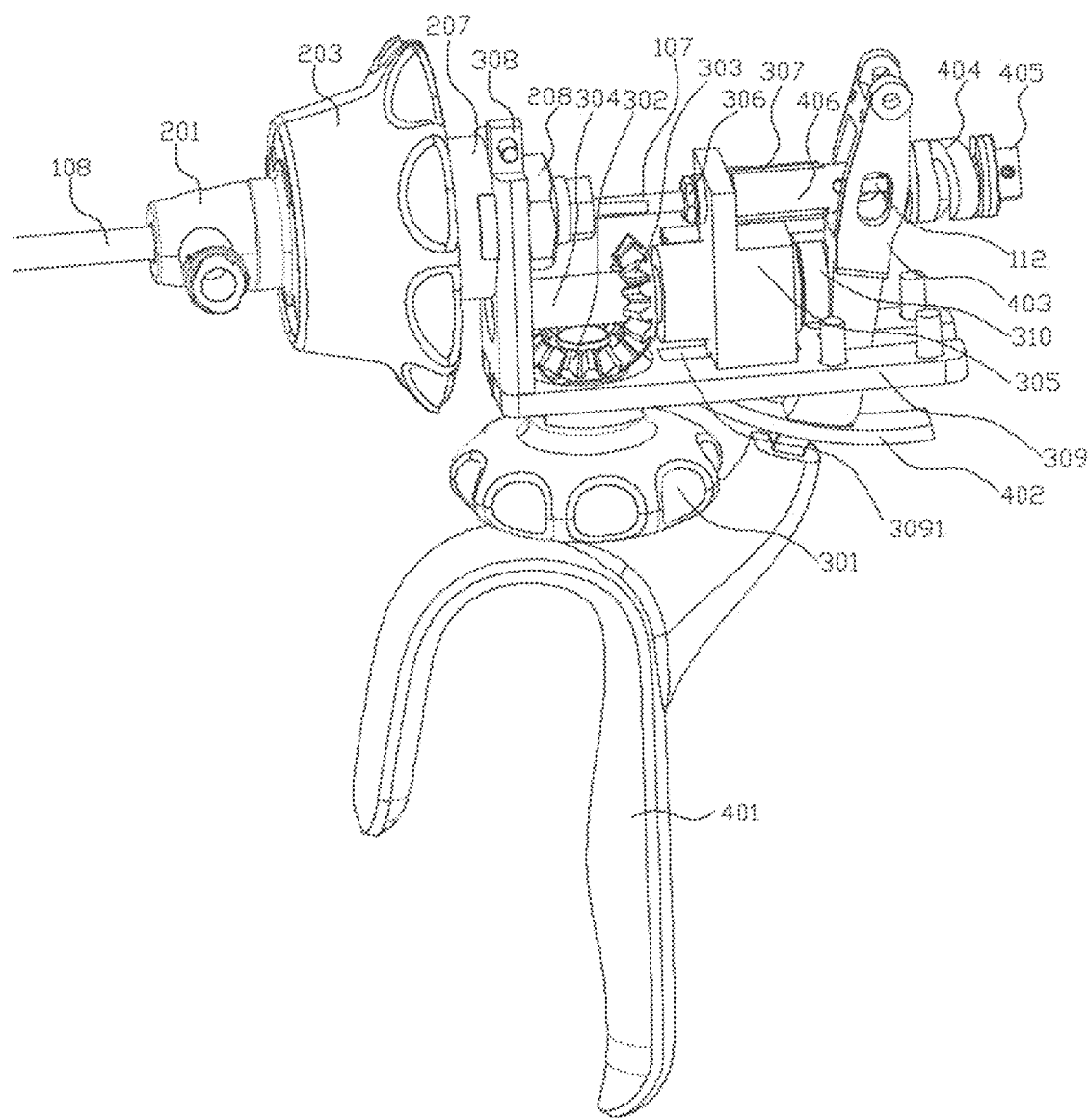
FIG. 9 is a three-dimensional diagram of the connection relationship between the clamp head rotation control mechanism, the clamp head bending control mechanism, and the clamp head opening and closing control mechanism.

As shown in FIG. 5, FIG. 8 to FIG. 10, the clamp head bending control mechanism 3 mainly includes a bending nut 301, bending lower teeth 302, bending upper teeth 303, a bending screw 304, a bending slider 305, an inner tube fixing nut 306, a bending transmission pin 307, an installation flange 308, a bottom plate 309, a bending screw rotating bearing 310, a bearing seat 311, a rotating shaft nut 312, a bearing 313 and a rotating shaft 314; the installation flange 308 is fixed at the front end of the bottom plate 309, and the middle of the bottom plate 309 is provided with a bending slider installation hole 3091; the center of the bending nut 301 is fixedly connected to the lower end of the rotating shaft 314 through the rotating shaft nut 312, the upper end of the rotating shaft 314 is connected to the bearing seat 311 through the bearing 313, the bearing seat 311 is fixed on the bottom plate 309; the upper end of the rotating shaft 314 extends the bottom plate 309, and the bending lower teeth 302 set is fixed on the upper end of the rotating shaft 314; the front end of the bending screw 304 is fixed on the installation flange 308; the bending upper teeth 303 is sleeved on the bending screw 304; the bending lower teeth 302 and the bending upper teeth 303 are connected by gear meshing, the bending slider 305 is set at the rear end of the bending screw 304, and the lower end of the bending slider 305 is installed in the bending slider installation hole 3091 in the middle of the bottom plate 309, the rear end of the bending screw 304 is installed on the opening and closing limit seat 408 in the clamp head opening and closing control mechanism 4 through the bending screw rotating bearing 310, the front end of the bending transmission pin 307 is fixed on the upper end of the bending slider 305, the inner tube 107 is extended from the clamp head rotation control mechanism 2 and inserted into the bending transmission pin 307, and is fixed on the upper end of the bending slider 305 through the inner tube fixing nut 306. The basic working principle of the bending control mechanism 3 is that, as shown in FIG. 9, the operator rotates the bending nut 301 clockwise to drive the bending lower teeth 302 to rotate clockwise, the bending upper teeth 303 is driven by the meshing between the bending lower teeth 302 and the bending upper teeth 303, and then the bending slider 305 is driven by the bending screw 304 to move backwards, at this time, the inner tube 107 is pulled backward by the action of the bending slider 305, the inner tube fixing nut 306 and the bending transmission pin 307, when the inner tube 107 is pulled backward, the rotating hinge support 110 can be pulled to move right, the forces among the rotating hinge support 110, the clamp head connecting ring 105, the clamp teeth fixing seat 104 and the outer tube 108 make the clamp teeth fixing seat 104, the upper clamp teeth 101 and the lower clamp teeth 102 bend upward, an the contrary, the operator rotates the bending nut 301 counterclockwise to drive the bending lower teeth 302 counterclockwise, the bending upper teeth 303 is driven to rotate by the meshing action between the bending lower teeth 302 and the bending upper teeth 303, and then the bending slider 305 is driven to move forward by the bending screw 304, at this time, the inner tube 107 is driven to move forward by the action of the bending slider 305, the inner tube fixing nut 306 and the bending transmission pin 307, when the inner tube 107 is pushed forward, the rotating hinge support 110 can be pushed forward, through the forces among the rotating hinge support 110, the clamp head connecting ring 105, the clamp teeth fixing seat 104 and the outer tube 108, the clamp teeth fixing seat 104, the upper clamp teeth 101 and the lower clamp teeth 102 are bent downward.

Figure 10:
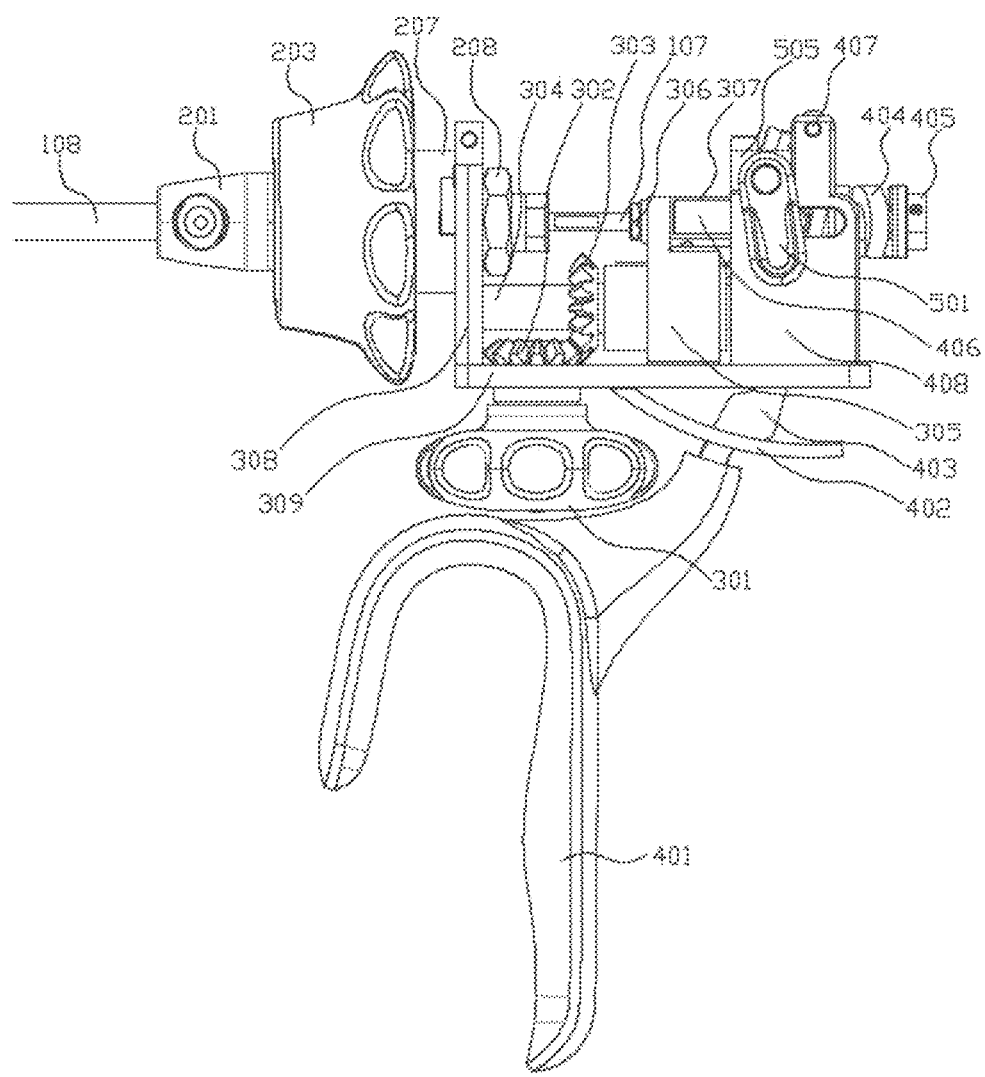
FIG. 10 is a front view of the connection relationship between the clamp head rotation control mechanism, the clamp head bending control mechanism, and the clamp head opening and closing control mechanism.
Figure 11:
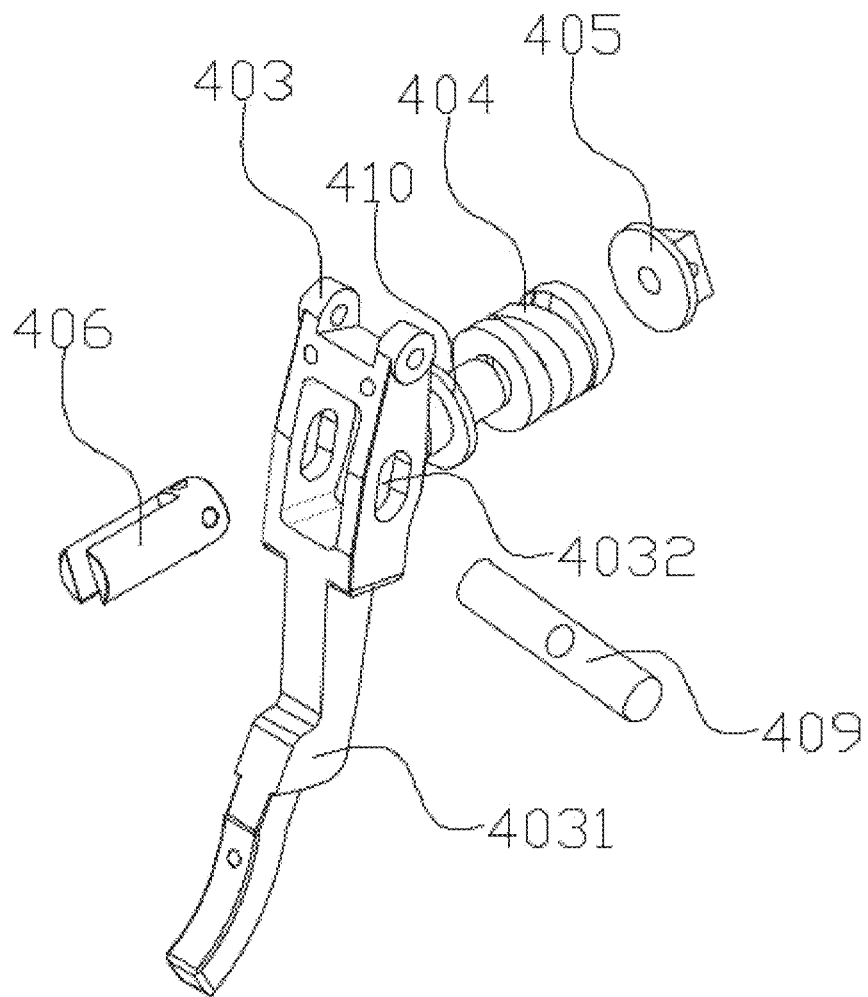
FIG. 11 is a schematic diagram of the connection relationship between the transmission rod, the opening and closing spring, the pull rod locking seat, and the opening and closing transmission pin.
Figure 12:
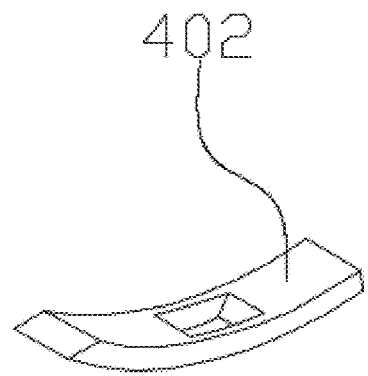
FIG. 12 is a structural diagram of the opening and closing handle limit pin.
Figure 13:
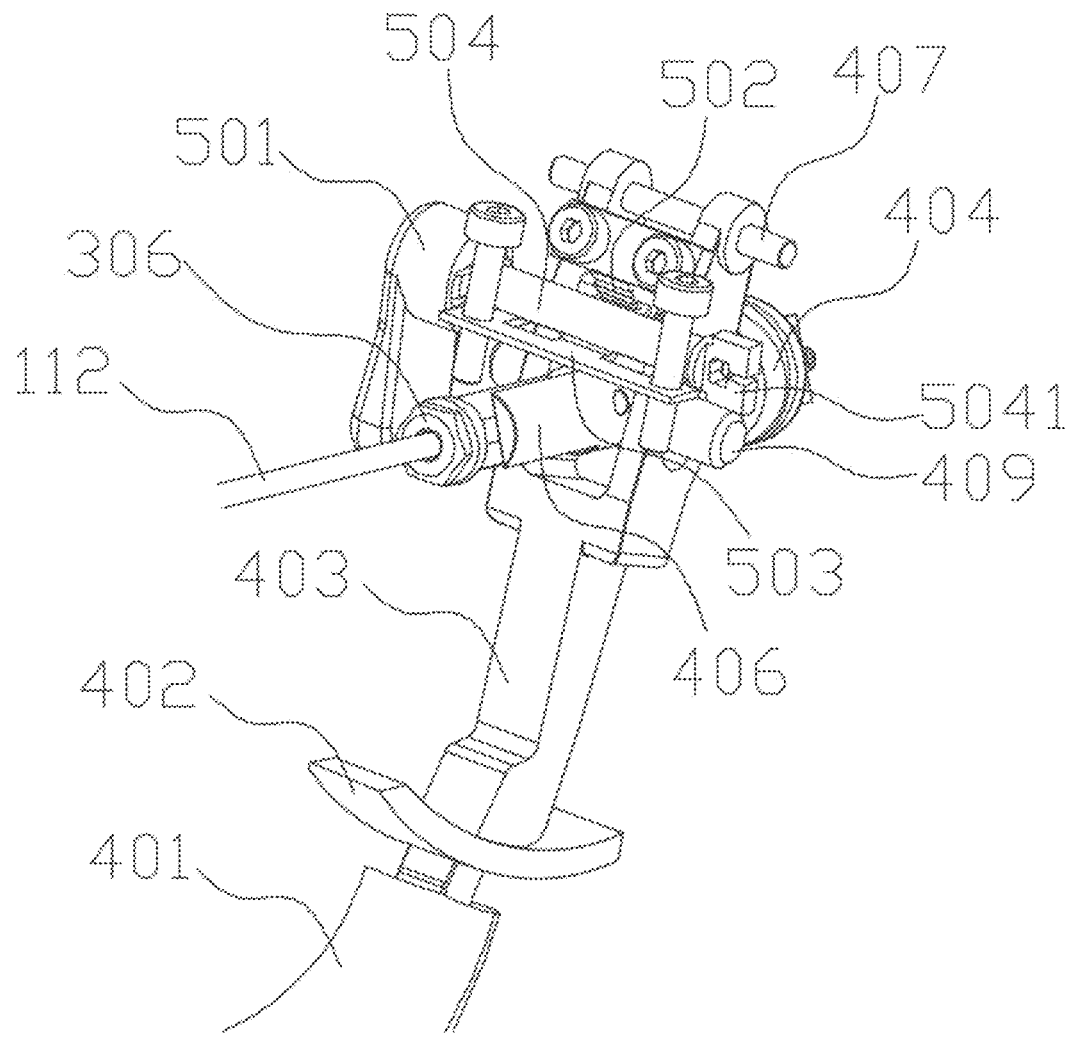
FIG. 13 is a structural diagram of the self-locking mechanism.

As shown in FIG. 5, FIG. 6, FIG. 9 to FIG. 12, the clamp head opening and closing control mechanism 4 mainly includes: an opening and closing handle 401, an opening and closing handle limit pin 402, an opening and closing handle transmission rod 403, an opening and closing spring 404, a pull rod locking seat 405, an opening and closing transmission pin 406, an opening and closing limit rod 407, an opening and closing limit seat 408, a push rod 409 and a sliding sleeve 410; the opening and closing limit seat 408 is fixed at the rear end of the bottom plate 309 in the clamp head bending control mechanism 3, and the opening and closing limit seat 408 is provided with rotating holes on both sides, the opening and closing handle 401 is similar to the hammer structure; as shown in FIG. 12, the opening and closing handle limit pin 402 is an arc structure, and an installation hole is arranged in the middle. As shown in FIG. 11, the lower end of the opening and closing handle transmission rod 403 is provided with a limit protrusion 4031, the upper end of the opening and closing handle transmission rod 403 is provided with a pull rod mounting hole 4032 on both sides of the upper end of the opening and closing handle transmission rod 403, and the middle of the upper end of the opening and closing handle transmission rod 403 is provided with a through hole; the lower end of the opening and closing handle transmission rod 403 passes through the middle mounting hole of the opening and closing handle limit pin 402, and then fixes the opening and closing handle limit pin 402 through the limit protrusion 4031; the lower end of the opening and closing handle transmission rod 403 is fixed and installed in the opening and closing handle 401 by bolts, after the opening and closing handle transmission rod 403 passes through the bottom plate 309 in the clamp head bending control mechanism 3, its upper end is installed in the upper end of the opening and closing limit seat 408 through the opening and closing limit rod 407; the front end of the opening and closing transmission pin 406 is a fork-shaped structure; the part of the inner tube 107 extending out the bending transmission pin 307 is inserted into the opening and closing transmission pin 406; the pull rod 112 in the inner tube 107 passes through the opening and closing transmission pin 406, the push rod 409 and the sliding sleeve 410 in turn, and is fixed in the pull rod locking seat 405 by bolts; among them, the pull rod 112 is connected to the opening and closing transmission pin 406 by bolts; the rear end of the driving pin 406 is connected to the middle of the pull rod 409; the two ends of the pull rod 409 are respectively installed in the push rod installation hole 4032 on both sides of the upper end of the opening and closing handle transmission rod 403, and the two ends of the pull rod 409 are respectively extended into the rotating hole position on the opening and closing limit seat 408, the two ends of the pull rod 409 can move horizontally in the rotating hole position on the opening and closing limit seat 408, the front end of the sliding sleeve 410 is fixed on the opening and closing handle transmission rod 403; the opening and closing spring 404 is set on the sliding sleeve 410, and the front end of the opening and closing spring 404 is fixed to the side wall of the sliding sleeve 410, and the rear end of the opening and closing spring 404 is fixed to the side wall of the pull rod locking seat 405. The basic working principle of the clamp head opening and closing control mechanism 4 is that, as shown in FIG. 10, the operator presses the opening and closing handle 401 backward, drives the upper end of the opening and closing handle transmission rod 403 to move backward, and the pull rod 409 moves backward in the rotating hole position of the opening and closing limit seat 408, at the same time, the opening and closing handle transmission rod 403 drives the sliding sleeve 410 to move backward and compresses the opening and closing spring 404, the push rod 409 drives the opening and closing transmission pin 406 and the pull rod 112 to move backward, when the pull rod 112 is pulled backward, the upper clamp teeth 101 and the lower clamp teeth 102 can be closed, on the contrary, the operator loosens the opening and closing handle 401, through the elastic restoring force of the opening and closing spring 404, the opening and closing handle transmission rod 403 is pushed forward, at the same time, the pull rod 409 is driven to move forward in the rotating hole position of the opening and closing limit seat 408, the pull rod 409 drives the opening and closing transmission pin 406 and the pulling rod 112 to move forward, when the pulling rod 112 is pushed forward, the transmission soft shaft 109 and the clamp head transmission soft shaft connecting pin 103 can be pushed forward, the force applied to the upper clamp teeth 101 and the lower clamp teeth 102 by the push rod 111 makes the upper clamp teeth 101 move upward and the lower clamp teeth 102 move downward, so that the upper clamp teeth 101 and the lower clamp teeth 102 are in the opening and closing state.

Figure 14:
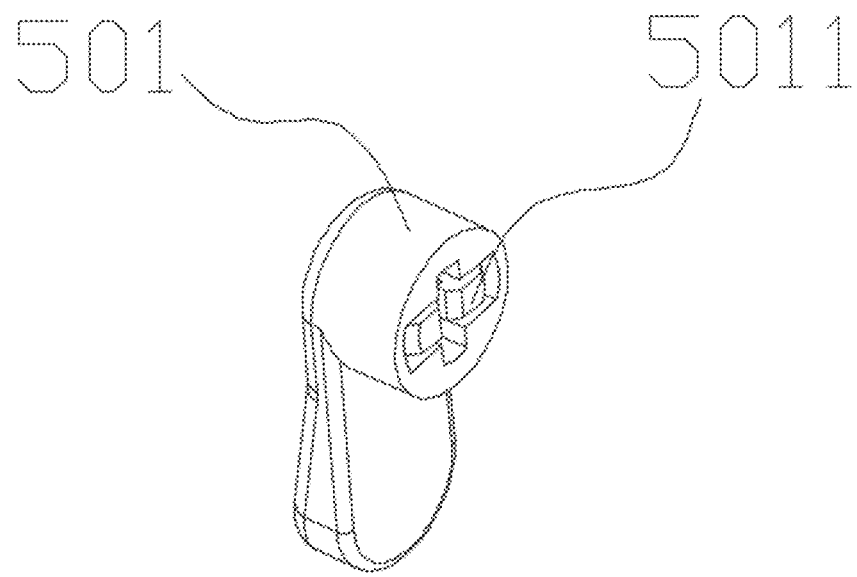
FIG. 14 is a structural diagram of the dial.
Figure 15:
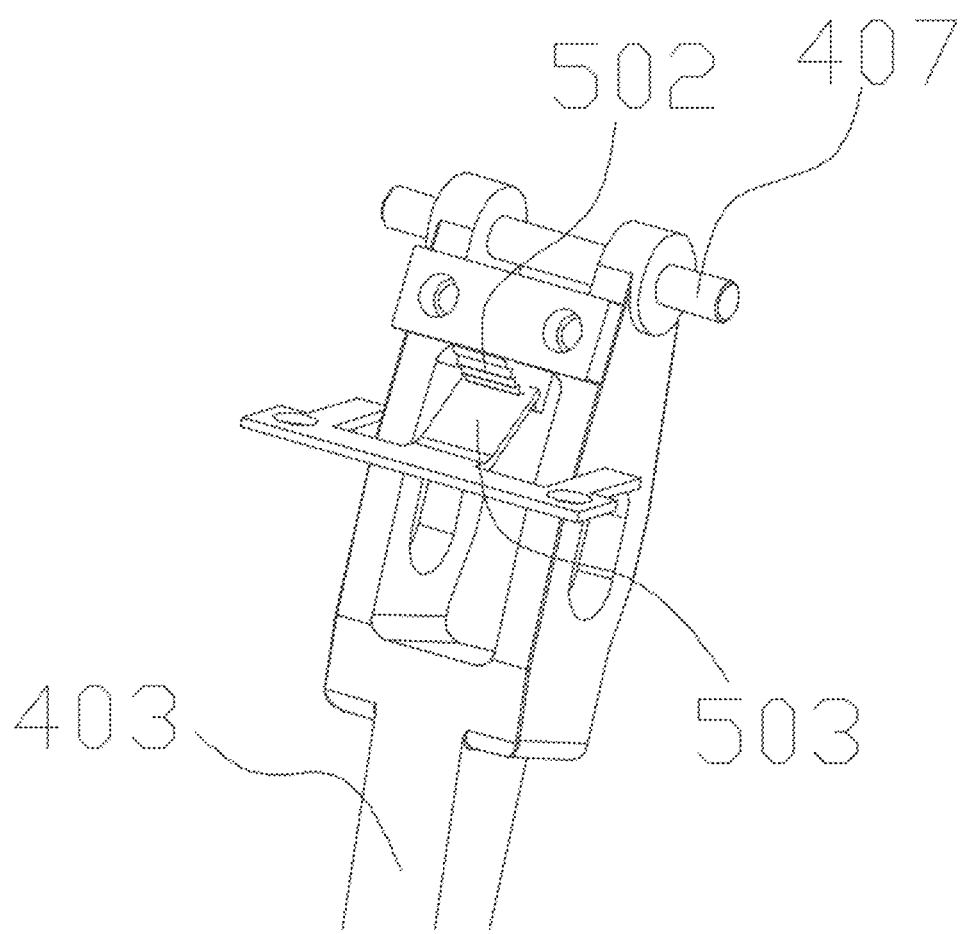
FIG. 15 is a schematic diagram of the connection relationship between the opening and closing locking disc and the self-locking elastic sheet.

As shown in FIG. 5, FIG. 6, FIG. 10, FIG. 13 to FIG. 15, the self-locking mechanism 5 mainly includes: dial 501, opening and closing locking disc 502, self-locking elastic sheet 503, unlocking shaft 504, block installation groove 5011, block 5041, self-locking support 505; the self-locking support 505 is fixedly installed at the upper end of the opening and closing limit seat 408 in the clamp head opening and closing control mechanism 4; the two dials 501 are installed on the self-locking support 505 through the unlocking shaft 504. Among them, the two ends of the unlocking shaft 504 are respectively provided with the blocks 5041, the center of the block 5041 is a through hole, and the block 5041 has an opening, which is connected with the center through hole; as shown in FIG. 14, the block installation groove 5011 is set inside the dial 501, and the blocks 5041 at both ends of the unlocking shaft 504 are respectively installed in the block installation groove 5011 of the dial 501, and then the unlocking shaft 504 can be driven to rotate by dial 501, the opening and closing locking disc 502 is fixed on the opening and closing handle transmission rod 403 in the clamp head opening and closing control mechanism 4 by bolts; as shown in FIG. 15, the opening and closing locking disc 502 is an arc structure as a whole, and the arc-shaped surface of the arc structure is provided with a tooth-shaped structure, the self-locking elastic sheet 503 is fixedly installed on the lower surface of the self-locking support 505; the elastic sheet in the center of the self-locking elastic sheet 503 is connected to the tooth-shaped structure of the arc-shaped surface of the opening and closing locking disc 502 by means of clamping teeth. When the self-locking mechanism 5 does not work, the elastic sheet in the center of the self-locking elastic sheet 503 does not contact the tooth-shaped structure of the arc-shaped surface of the opening and closing locking disc 502 to release the self-locking state. When the self-locking mechanism 5 works, the elastic sheet in the center of the self-locking elastic sheet 503 contacts with the tooth-shaped structure of the arc-shaped surface of the opening and closing locking disc 502 to form a self-locking state, the elastic sheet in the center of the self-locking elastic sheet 503 is connected to the unlocking shaft 504 by pressing. The basic working principle of self-locking mechanism 5 is that the operator presses the opening and closing handle 401 backward, drives the upper end of the opening and closing handle transmission rod 403 to move backward, so that the opening and closing locking disc 502 and the self-locking elastic sheet 503 can realize the contact state of the teeth, and then realize the self-locking state, at this time, the clamp head mechanism 1 is in the self-locking state (self-locking in the opening and closing process and self-locking in the bending process); as shown in FIG. 10, the operator rotates the dial 501 forward, and at the same time drives the unlocking shaft 504 to rotate, so that the unlocking shaft 504 presses the elastic sheet at the center of the self-locking elastic sheet 503, so that the self-locking elastic sheet 503 and the opening and closing locking disc 502 are released from the contact state, thereby removing the self-locking state of the clamp head mechanism 1.

In the description of the invention, it is necessary to understand that the orientation or positional relationship indicated by the terms center, vertical, horizontal, front, back, left, right, vertical, horizontal, top, bottom, inside, outside is based on the orientation or positional relationship shown in the attached figures, which is only for the convenience of describing the invention and simplifying the description, rather than indicating or implying that the device or component must have a specific orientation, be constructed and operated for a specific orientation, it cannot be understood as a limitation on the protection content of the invention.

What is claimed is:

1. A hand-held pistol-shaped multi-angle bending surgical instrument, comprising a clamp head mechanism, a clamp head rotation control mechanism, a clamp head bending control mechanism, a clamp head opening and closing control mechanism, a self-locking mechanism, and a pistol-shaped handle; the clamp head mechanism is connected to the clamp head rotation control mechanism, the clamp head bending control mechanism, and the clamp head opening and closing control mechanism respectively; the clamp head rotation control mechanism is connected to the clamp head bending control mechanism; the clamp head bending control mechanism is connected to the clamp head opening and closing control mechanism; the clamp head opening and closing control mechanism is connected to the self-locking mechanism; the clamp head bending control mechanism, the clamp head opening and closing control mechanism, and the self-locking mechanism are connected to the pistol-shaped handle;

wherein the clamp head rotation control mechanism comprises:
an instrument flushing connector and a rotating base, wherein the instrument flushing connector and the rotating base are arranged in turn on an outer tube, and a rear end of the rotating base is installed on the clamp head bending control mechanism and is fixed by a locking nut;
a locking spring set on the rotating base;
a rotating end cover and a fixing ring, wherein the rotating end cover and the fixing ring are installed on the locking spring in turn; an outer ring of the fixing ring is connected to a side wall of the rotating end cover; a front end of the locking spring is resisted and fixed on an inner wall of the rotating end cover, and a rear end of the locking spring is resisted and fixed on the clamp head bending control mechanism; and an inner ring of the rotating end cover is provided with a plurality of limiting grooves, wherein the plurality of limiting grooves are uniformly distributed;
a rotating nut, wherein the rotating nut is assembled on the instrument flushing connector and the rotating end cover, and an inner ring of the rotating nut is connected to an outer ring of the rotating end cover; and
a rotating locking pin, wherein the rotating locking pin is installed on an outer wall of the rotating base; when the clamp head mechanism is in a rotating self-locking state, the rotating locking pin is inserted into a limiting groove of the plurality of limiting grooves of the inner ring of the rotating end cover; when the clamp head mechanism is in a free rotating state, the rotating locking pin is separated from the limiting groove of the inner ring of the rotating end cover;

wherein an instrument flushing port is arranged on a front side wall of the instrument flushing connector; a rear end of the instrument flushing connector is provided with two symmetrical protrusions, and each of the two symmetrical protrusions is provided with a first guide hole; a front end of the inner ring of the rotating nut is equipped with two symmetrical grooves, and the two symmetrical grooves at the front end of the inner ring of the rotating nut are installed with the two symmetrical protrusions at the rear end of the instrument flushing connector; two symmetrical second guide holes are arranged on the side wall of the rotating end cover, and the two symmetrical second guide holes on the side wall of the rotating end cover are connected one-to-one with the first guide holes on the two symmetrical protrusions on the rear end of the instrument flushing connector through a rotating guide shaft.

2. The hand-held pistol-shaped multi-angle bending surgical instrument according to claim 1, wherein the clamp head mechanism comprises:
a clamp teeth fixing seat;
upper clamp teeth and lower clamp teeth, wherein the upper clamp teeth and the lower clamp teeth are respectively installed at a front end of the clamp teeth fixing seat;
a clamp head transmission soft shaft connecting pin inserted in the clamp teeth fixing seat;
a first push rod inserted in a front end of the clamp head transmission soft shaft connecting pin, wherein two ends of the first push rod are connected to the upper clamp teeth and the lower clamp teeth respectively;
the outer tube connected to the clamp head rotation control mechanism;
an inner tube placed in the outer tube and connected to the clamp head bending control mechanism;
a pull rod arranged in the inner tube and connected to the clamp head opening and closing control mechanism;
a rotating hinge support arranged in the outer tube, wherein the inner tube is connected to the rotating hinge support;
a clamp head connecting ring, wherein both ends of the clamp head connecting ring are respectively connected to the clamp teeth fixing seat and the rotating hinge support;
a transmission soft shaft guide block placed at a rear end of the clamp teeth fixing seat, wherein two sides of a rear end of the transmission soft shaft guide block and two sides of the rear end of the clamp teeth fixing seat are respectively connected to the outer tube through a pin shaft; and
a transmission soft shaft, wherein the transmission soft shaft is inserted into the transmission soft shaft guide block, the clamp teeth fixing seat, and the clamp head transmission soft shaft connecting pin in turn, and two ends of the transmission soft shaft are connected to the clamp head transmission soft shaft connecting pin and the pull rod respectively.

3. The hand-held pistol-shaped multi-angle bending surgical instrument according to claim 2, wherein clamp teeth on an upper clamp teeth surface are set one-to-one corresponding to clamp teeth on a lower clamp teeth surface.

4. The hand-held pistol-shaped multi-angle bending surgical instrument according to claim 2, wherein the clamp head bending control mechanism comprises:

a bottom plate;
an installation flange fixed at a front end of the bottom plate, wherein the installation flange is connected to the clamp head rotation control mechanism;
a bearing seat fixed on the bottom plate;
a rotating shaft connected to the bearing seat through a bearing, wherein an upper end of the rotating shaft extends out of the bottom plate;
a bending nut connected to a lower end of the rotating shaft by a rotating shaft nut;
bending lower teeth fixedly sleeved at the upper end of the rotating shaft;
a bending screw fixed on the installation flange, wherein a rear end of the bending screw is installed on the clamp head opening and closing control mechanism through a bending screw rotating bearing;
bending upper teeth fixedly sleeved at the bending screw, wherein the bending lower teeth and the bending upper teeth are meshed with each other;
a bending slider arranged at the rear end of the bending screw; and
a bending transmission pin fixed on an upper end of the bending slider, wherein after the inner tube is extended from the clamp head rotation control mechanism, the inner tube is first fixed on the upper end of the bending slider through an inner tube fixing nut, and then passes through the bending transmission pin.

5. The hand-held pistol-shaped multi-angle bending surgical instrument according to claim 4, wherein a bending slider installation hole is arranged in a middle of the bottom plate, a protrusion is arranged at a lower end of the bending slider, and the protrusion at the lower end of the bending slider is installed in the bending slider installation hole of the bottom plate.

6. The hand-held pistol-shaped multi-angle bending surgical instrument according to claim 4, wherein the clamp head opening and closing control mechanism comprises:
an opening and closing limit seat fixed at a rear end of the bottom plate of the clamp head bending control mechanism, wherein the opening and closing limit seat is provided with rotating hole positions on both sides of the opening and closing limit seat, and the bending screw rotating bearing is installed on the opening and closing limit seat;
an opening and closing handle transmission rod installed at an upper end of the opening and closing limit seat through an opening and closing limit rod, wherein a lower end of the opening and closing handle transmission rod passes through the bottom plate of the clamp head bending control mechanism, and an upper end of the opening and closing handle transmission rod is respectively provided with push rod installation holes on both sides;
an opening and closing handle connected to the lower end of the opening and closing handle transmission rod;
an opening and closing handle limit pin sleeved on the opening and closing handle transmission rod;
a second push rod, wherein two ends of the second push rod are respectively installed in the push rod installation holes on the both sides of the upper end of the opening and closing handle transmission rod, the two ends of the second push rod are respectively extended into the rotating hole positions on the opening and closing limit seat, and the two ends of the second push rod are allowed to move horizontally in the rotating hole positions of the opening and closing limit seat;
a pull rod locking seat fixed to an end of the pull rod;
a sliding sleeve fixed on the opening and closing handle transmission rod;
an opening and closing spring set on the sliding sleeve, wherein two ends of the opening and closing spring are fixed on the sliding sleeve and the pull rod locking seat respectively; and
an opening and closing transmission pin, wherein two ends of the opening and closing transmission pin are respectively connected to the pull rod and the second push rod, and a part of the inner tube extending out of the bending transmission pin is inserted into the opening and closing transmission pin; the pull rod is fixed in the pull rod locking seat after passing through the opening and closing transmission pin, the second push rod, and the sliding sleeve in turn.

7. The hand-held pistol-shaped multi-angle bending surgical instrument according to claim 6, wherein the opening and closing handle limit pin is an arc structure with an installation hole in the middle; the lower end of the opening and closing handle transmission rod is provided with a limit protrusion, and a middle of the upper end of the opening and closing handle transmission rod is provided with a through hole; the lower end of the opening and closing handle transmission rod passes through a middle mounting hole of the opening and closing handle limit pin, and then fixes the opening and closing handle limit pin through the limit protrusion.

8. The hand-held pistol-shaped multi-angle bending surgical instrument according to claim 6, wherein the self-locking mechanism comprises:
a self-locking support fixed at the upper end of the opening and closing limit seat;
an unlocking shaft installed on the self-locking support;
two dials respectively installed at both ends of the unlocking shaft;
an opening and closing locking disc fixed on the opening and closing handle transmission rod, wherein the opening and closing locking disc is an arc-shaped structure as a whole, and an arc-shaped surface is provided with a tooth-shaped structure; and
a self-locking elastic sheet fixed at a lower end of the self-locking support, an elastic sheet in a center of the self-locking elastic sheet is connected to the tooth-shaped structure of the arc-shaped surface of the opening and closing locking disc in a manner of clamping teeth, and the elastic sheet in the center of the self-locking elastic sheet is connected to the unlocking shaft in a manner of pressing; when the self-locking mechanism does not work, the elastic sheet at the center of the self-locking elastic sheet does not contact with the tooth-shaped structure of the arc-shaped surface of the opening and closing locking disc to relieve a self-locking state, when the self-locking mechanism works, the elastic sheet at the center of the self-locking elastic sheet contacts with the tooth-shaped structure of the arc-shaped surface of the opening and closing locking disc to form the self-locking state.

\* \* \* \* \*

UNITED STATES PATENT AND TRADEMARK OFFICE
CERTIFICATE OF CORRECTION

| | | |
|---|---|---|
| PATENT NO. | : 12,484,923 B1 | Page 1 of 1 |
| APPLICATION NO. | : 19/200757 | |
| DATED | : December 2, 2025 | |
| INVENTOR(S) | : Baosheng Wang et al. | |

It is certified that error appears in the above-identified patent and that said Letters Patent is hereby corrected as shown below:

On the Title Page

Item (30) Foreign Application Priority Data should read:
Jun. 11, 2024 (CN) ....................202410744337.7

Signed and Sealed this
Twentieth Day of January, 2026

John A. Squires
*Director of the United States Patent and Trademark Office*